E. W. POOLE & J. H. HEFFELFINGER.
LOCKING DEVICE FOR PORCELAIN FACINGS.
APPLICATION FILED FEB. 8, 1907.
909,662.
Patented Jan. 12, 1909.
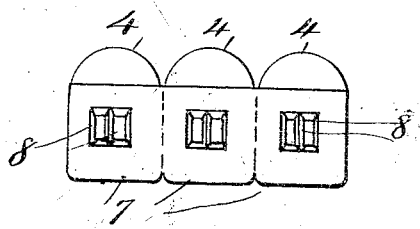
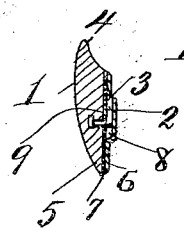
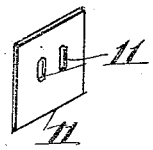
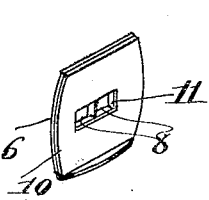
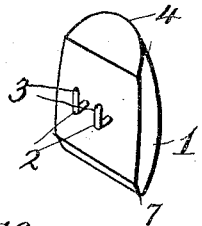
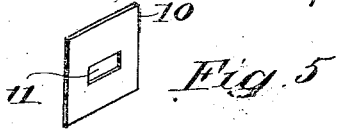

UNITED STATES PATENT OFFICE.

EDWIN W. POOLE AND JUDD H. HEFFELFINGER, OF CLEVELAND, OHIO.

LOCKING DEVICE FOR PORCELAIN FACINGS.

No. 909,662.  Specification of Letters Patent.  Patented Jan. 12, 1909.

Application filed February 8, 1907. Serial No. 356,313.

*To all whom it may concern:*

Be it known that we, EDWIN W. POOLE and JUDD H. HEFFELFINGER, citizens of the United States, and residents of Cleveland, county of Cuyahoga, State of Ohio, have invented certain new and useful Improvements in Locking Devices for Porcelain Facings, of which we hereby declare the following to be a full, clear, and exact description, such as will enable others skilled in the art to which it appertains to make and use the same.

The invention relates to detachable artificial teeth and has especial reference to detachable porcelain facings which are employed in connection with metal backing plates to build up bridge work having any desired number of teeth.

The leading feature of this invention consists in the use of instrumentalities for securing the facing to the backing plate without the use of solder, and in which the porcelain is releasable by first pressing back the gingival edge thereof and then withdrawing it longitudinally.

The invention further consists in the combination and arrangement of parts and construction of details as hereinafter described, shown in the accompanying drawings and specifically pointed out in the claims.

In the accompanying drawings, Figure 1 is an elevation of three porcelain facings or teeth mounted upon connected back plates to form a bridge; Fig. 2 is a vertical transverse section of a completed backing plate with the facing attached and showing the under cut cavity in the backing plate into which are locked hook shaped keepers preferably baked into the porcelain facing; Fig. 3 is a perspective view of the inner surface of the composite backing plate; Fig. 4 is a perspective view of the corresponding surface of the porcelain facing; Fig. 5 is a perspective view of the inner plate alone; Fig. 6 shows an inner plate provided with two openings.

In these views 1 is a porcelain facing into which are baked or otherwise securely attached the two pins 2 upon a common horizontal plane. These pins project rearward a little and thence curve at 3 towards the gingival edge 4 of the tooth, forming hook shaped projections or keepers pointing away from the incisive edge 5.

6 is the backing plate which is turned slightly forward at its lower edge 7 to inclose the incisive edge of the tooth, and is provided with a recess 8 deep enough to include the hooked keepers 2 and is provided also with an overhanging edge 9 underneath which the portions 3 of the hooks are inserted and against which the horizontal straight portions of the hooks engage. This overhanging edge is preferably formed by means of the inner plate 10 which is soldered to the backing plate and which is provided with a narrow opening or with openings 11 just wide enough to permit of the introduction of the hooked pins.

When the plates are soldered together a unitary backing is produced ready for the application of the facing. This can readily be put in position when the bridge is in the mouth by a sliding movement of the facing, but as soon as the facing is located and its incisive edge rests in the outwardly turned edge 7 of the plate or backing it is impossible to remove the facing by means of any vertical force alone, such as would be caused by eating or by means of any lateral movement or transverse movement of the incisive edge.

The only way in which the facing may be removed must be by pressing inward upon the gum or gingival end of the facing until the incisive edge thereof is slightly raised to pass the outwardly turned edge of the backing plate, and then by sliding the tooth away from the gum end of the backing until it is released, since the facing is held at the incisive edge, at the overhanging edge which rests upon the pins, and by the upwardly pointing hooks which are inserted within the cavity.

To prevent a loose fit or accidental removal of the facing the cavity or recess 8 is preferably filled with cement which hardening about and in particular below the hooks prevents any movement thereof and prevents the withdrawal of the facing.

The facing can readily be removed and another inserted if broken while in the mouth, without removing the bridge therefrom.

We are aware that heretofore a backing plate has been attached by means of solder and a staple to a porcelain facing but such I do not claim as my invention, but What we do claim as new and desire to secure by Letters Patent is:—

1. The combination with a metal plate provided with a recess having an overhanging edge, of a porcelain facing, hook shaped keepers extending rearwardly therefrom and adapted to enter said recess underneath said overhanging edge, and an outwardly curved edge for said metal plate, upon which the incisive edge of said facing is adapted to rest, said porcelain facing being releasable by means of pressure at the gingival edge only substantially as described.

2. In combination in an artificial tooth adapted for bridge work, a metal backing plate provided with a recess, an inner plate attached thereto, and provided with a narrow opening one edge of which overhangs said recess, a porcelain facing, hook shaped keepers therein projecting rearwardly therefrom and adapted to enter said recess in said back plate underneath said overhanging edge, and an outwardly curved edge for one of said back plates on which the facing rests, said porcelain facing being releasable by first pressing backward the gingival edge thereof and then withdrawing it longitudinally substantially as described.

In testimony whereof we hereunto set our hands this 6" day of February 1907.

EDWIN W. POOLE.
JUDD H. HEFFELFINGER.

Witnesses:
WM. M. MONROE,
GEO. S. COLE.